US007731882B2

(12) United States Patent
Bech et al.

(10) Patent No.: US 7,731,882 B2
(45) Date of Patent: Jun. 8, 2010

(54) CONNECTION BETWEEN MEMBERS (75) Inventors: Anton Bech, Ringkøbing (DK); Frank A. Hoelgaard Hahn, Ringkøbing (DK)

(73) Assignee: Vestas Wind Systems A/S (DK)

(*) Notice: Subject to any disclaimer, the term of this patent is extended or adjusted under 35 U.S.C. 154(b) by 1083 days.

(21) Appl. No.: 10/547,748

(22) PCT Filed: May 28, 2003

(86) PCT No.: PCT/EP03/05630

§ 371 (c)(1),
(2), (4) Date: Sep. 2, 2005

(87) PCT Pub. No.: WO2004/078462

PCT Pub. Date: Sep. 16, 2004

(65) Prior Publication Data

US 2006/0175731 A1     Aug. 10, 2006

(30) Foreign Application Priority Data

| Mar. 6, 2003 | (WO) | ............ PCT/EP03/02292 |
| Mar. 6, 2003 | (WO) | ............ PCT/EP03/02293 |
| Apr. 22, 2003 | (WO) | ............ PCT/EP03/04167 |
| Apr. 22, 2003 | (WO) | ............ PCT/EP03/04171 |

(51) Int. Cl.
*B29C 45/14* (2006.01)

(52) U.S. Cl. .................................... 264/259

(58) Field of Classification Search ............... 264/259
See application file for complete search history.

(56) References Cited

U.S. PATENT DOCUMENTS

| 5,968,445 | A  | * | 10/1999 | McCarville et al. ......... 264/571 |
| 6,457,943 | B1 | * | 10/2002 | Olsen et al. ................ 416/230 |
| 2004/0146696 | A1 | | 7/2004 | Jones |
| 2004/0192137 | A1 | | 9/2004 | Starkey et al. |
| 2006/0083907 | A1 | | 4/2006 | Bech et al. |

FOREIGN PATENT DOCUMENTS

| DE | 39 06 872 | 9/1990 |
| GB | 2 376 660 | 12/2002 |
| GB | 2 378 995 | 2/2003 |
| JP | 60 027523 | 2/1985 |
| WO | WO-02 081189 | 10/2002 |
| WO | WO 02090089 A1 * | 11/2002 |

* cited by examiner

*Primary Examiner*—Kat Wyrozebski
*Assistant Examiner*—Xue Liu
(74) *Attorney, Agent, or Firm*—Stites & Harbison PLLC; Marvin Petry; Stephen J. Weyer (57) ABSTRACT

A method for preparing a more reliable connection between two members (2, 4) is provided. The method involves the use of a gas-removal layer (6), which allows for gas transport in a number of overall directions in a plane of the gas-removal layer. The gas-removal layer comprises a resin (12) and during consolidation the gas-removal layer is deformed to form a collection substantially free from entrapped gas voids. Furthermore, a gas-removal layer is provided as well as a mould for casting of gas-removal layers and a method for preparing such a mould. The method and the gas-removal layer provided are particularly useful for manufacturing of wind turbine blades and spars for such blades.

30 Claims, 3 Drawing Sheets

CONNECTION BETWEEN MEMBERS

TECHNICAL FIELD OF THE INVENTION

The invention relates to connecting of members such as members comprising resin and fibres. In particular, the invention relates to removal of gas from the interface between the members during preparation of the connection.

BACKGROUND OF THE INVENTION

It is a demand within the field of structural composites to produce still larger composite structures. The size of wind turbine blades and spars for wind turbine blades is for example constantly being increased to an extent where preparation of one-piece members requires unacceptable resources. Such resources may for example be large processing times during laying of layers and large production facilities with regard to apparatus size and space requirements. It is therefore desirable to prepare the composite structures in smaller members and connect these members to form the final structure at a later stage and/or facility.

Members to be connected may be non-cured, partially cured such as pre-consolidate or fully cured, respectively. In general, the members are becoming increasingly rigid with the degree of curing.

Experimental work has shown that presence of voids in the interface between connected members is detrimental to the mechanical performance of the connection. As a part of the connecting procedure it is therefore typically attempted to remove gas from the interface. However, if at least one of the members is not rigid, i.e. not fully cured, a significant risk remains that gas may be entrapped between the members without any chance of removing it by for example applying a vacuum.

This is for example the situation in GB 2 378 995 A, where a connection between two members via a compressible composite material is disclosed. The compressible composite comprises a fibrous material and a resinous material. The bulk of the compressible composite is substantially devoid of air void. In use, the compressible composite member is placed between the members to be connected and then formed to resemble the shape of the gap between the members by forcing the resinous material to leave the compressible composite. As the composite structure between the members are substantially devoid of air voids and reinforced by fibres, it may typically possess a high mechanical strength, but the preparation method does not take into account the aforementioned substantial risk of entrapment of gas between the individual member and the composite structure. The weak region of the combined structure as described in GB 2 378 995 A is hence the interfaces between the compressible composite material and each of the members.

When the connection is furthermore bearing a load, such as most connections between members reinforced by unidirectional fibres in the longitudinal direction of the fibres, the sensitivity towards voids in the interface represents a major course of lack of process reliability.

There is therefore an urgent need for a method of connecting members without the risk of having voids in the interface.

Furthermore, the connection between the members should be highly reproducible and reliable and possess good mechanical strength.

DISCLOSURE OF THE INVENTION

It is the object of the invention to provide a more reliable connection between members such as members comprising resin and fibres.

The above and other objects of the invention may be realised by a method comprising the steps of:
 providing a first member;
 providing a second member adjacent to said first member;
 providing a gas-removal layer in at least a part of an interface between said first member and said second member, said gas-removal layer allows for gas transport in a number of overall directions in a plane of said gas-removal layer and said gas-removal layer comprising a resin;
 removing gas from said interface between said first member and said second member via said gas-removal layer;
 deforming said gas-removal layer and
 consolidating and/or curing said interface.

The first member and/or the second member may optionally be co-consolidating and/or co-cured together with the interface.

The first and the second member preferably comprise a first and a second resin and a first and a second type fibres, respectively. The members may also comprise for example fillers and/or other elements known in the art to be addable to such composite members.

The resin comprised in the gas-removal layer will be denoted third resin to distinguish it from the first and the second resin.

The first, the second and the third resin, respectively, may be based on for example unsaturated polyester, polyurethane, vinyl ester, epoxy, thermoplastics, similar chemical compounds or combinations of these. In a preferred embodiment, the composition of the invention of the third resin is compatible to first and the second resin. In another preferred embodiment, the first and the second resin have substantially the same composition. The third resin may or may not have substantially the same composition as the first resin and/or the second resin. By having substantially the same composition with respect to resin composition is meant that at least one of the main components of the resins is the same. In a preferred embodiment, the first, the second and the third resin are based on one or more epoxy compositions. Actual formulations of relevant resins are well known in the art.

The first and the second type fibres, respectively, may be based on for example one or more fibre types selected from the group consisting of carbon fibres, glass fibres, aramid fibres, synthetic fibres (e.g. acrylic, polyester, PAN, PET, PE, PP or PBO-fibres, etc.), bio fibres (e.g. hemp, jute, cellulose fibres, etc.), mineral fibres (e.g. Rockwool™, etc.), metal fibres (e.g. steel, aluminium, brass, copper, etc.), boron fibres and combinations of two or more of these. In a preferred embodiment, the first and the second type fibres are the same. In a more preferred embodiment, the fibres are mainly carbon fibres.

The fibres comprised in the members may have an oriented (e.g. uniaxial, biaxial or multiaxial) and/or a random distribution, however, it is preferred that the fibres are mainly oriented. If one or more of the members is a laminated composite, the orientation of the individual layers comprising fibres may or may not be the same. In a preferred embodiment, the load-bearing fibres are mainly oriented unidirectionally in a longitudinal direction. In a more preferable embodiment of the present invention, the members are connected to efficiently extend the length of the unidirectional fibres, i.e. in the longitudinal direction of the fibres.

The fibres comprised in the members may be provided as for example individual or groups of fibres, fibre tows, tow pregs, woven or non-woven fabrics, mats, semi-pregs, prepregs, pre-forms or a combination of two or more of these.

The members to be connected may be either unconsolidated or at least partially consolidated. By consolidated is meant that most (preferably all) gas has been removed from inside the member. The consolidation may for example involve heating and/or pressing and/or applying a vacuum. The consolidation may optionally involve partially or fully curing of the member. In a preferred embodiment, at least one of the members is pre-consolidated. An example of an unconsolidated structure within the scope of members relevant to the present invention is a pre-form as disclosed in WO 2004/078443 incorporated herein by reference. An example of an at least partially consolidated pre-form is a pre-consolidated pre-form as disclosed in WO 2004/078442 incorporated herein by reference. However, a person skilled in the art will know and be able to prepare many other types of members within the scope of members relevant for connecting by the method according to the present invention.

The members to be connected may be uncured, partially cured or fully cured, respectively, however, the advantage of the present invention is typically more pronounced for uncured or partially cured members than for fully cured members. This is mainly due to the rigidity of a member increasing with the degree of curing, but the stickiness of the member also tends to decrease with increasing degree of curing. In other words, it is more likely to form gas voids at the interface if the resin of the member has a low degree of curing than if the resin of the member has a high degree of curing.

Even though the term cured typically refers to thermosetting resins, the present invention is not limited to thermosetting resins. A member comprising a thermoplastic resin may be connected to one or more members comprising thermoplastic and/or thermosetting resins by the method according to the invention without departing from the inventive idea.

The group of members relevant to the present invention is hence any uncured, partially cured or fully cured; unconsolidated, partially consolidated or fully consolidated composite member, which requires connection to another member.

It should be observed that it is within the scope of the invention to connect a member as described hereinbefore to any type of structure using the claimed method.

By gas is herein meant entrapped atmospheric air as well as gaseous products, by-products and starting materials related to the preparation process.

An essential feature of the present invention is the use of a gas-removal layer comprising a third resin. The gas-removal layer comprises a geometrical structure, which allows for removal of gas during processing of the connection, preferably at least during initiation of the consolidation and/or the curing of the connection. The gas-removal layer should preferably be allowed for gas transport in a number of overall directions at least in a plane of said gas-removal layer for example to control and/or prevent or diminish orientation effects. In a preferred embodiment, gas is allowed to move in any overall direction in a plane of said gas-removal layer. In a preferred embodiment, the gas-removal layer comprises essentially a resin, i.e. third resin, with a geometrical structure, which allows the removal of gas.

In a preferred embodiment, the gas transportation network of the gas-removal layer comprises a number of third resin volumes forming a three-dimensional landscape with many mountains separated from each other. The gas transportation network hence being formed by the volume between the mountains or peaks. The third resin volumes may or may not be interconnected. Interconnected third resin volumes may for example be connected to a support as discussed below. Third resin volumes not being interconnected may for example be a collection of particles provided directly in the interface between the first and the second member as discussed below. In the following, the term independent third resin volumes will denote a number of interconnected or not interconnected third resin volumes forming a three-dimensional landscape with a gas transportation network in at least two dimensions.

By gas transport in an overall direction is meant movement parallel to a direction from side to side of the gas-removal layer. Hence, the overall direction does not refer to the direction within the gas-removal layer on a local scale where some parts may be closed off. The requirement that the gas-removal layer should allow for gas transport in a number of overall directions should only refer to the situation prior to the initiation of the consolidation and/or curing. However, the gas-removal layer should stay open for an extended period of time to ensure a thorough removal of gas, for example in the beginning of the consolidation and/or curing process.

By a plane of the gas-removal layer is meant an imaginary layer substantially parallel to a main surface of the gas-removal layer on a local scale. Hence, if the gas-removal layer is applied on a curved surface, such as a part of an outer surface of a polyhedron, said plane may also be curved.

To just appreciate the present invention it is crucial to recognise the difference between preparing of an individual member and connection of such members. Channels for transporting gas is known from the art of preparing members comprising fibres and a resin. In WO021094564A1, GB2376660A and WO02/090089A1 examples of venting structures are disclosed. However, all of these venting structures require interaction with a fibrous material to realise sufficient venting effect. In a member, this is not a problem as fibrous material is typically present anyway, and in some cases the fibrous material may contribute to the reinforcement of the member. When connecting two members, the situation is completely different. The introduction of a fibrous layer with sufficient thickness to effect the venting of the gas is often disadvantageous as the fibres typically are oriented in the plane of the interface and hence do not contribute to the mechanical strength of the connection. In many cases, the introduction of such a layer may even weaken the connection as the distance between the load-bearing fibres of the members are separated with a greater distance if the fibres are present than if the fibres are not present. The methods for venting gas known from the art of preparing members will hence not lead to a reliable product if used for connecting members.

The method according to the present invention provides a venting structure without having the need for introduction of a fibrous material into the interface between the members. Furthermore, the method according to the present invention is easy and fast to manufacture as will be discussed below.

The gas-removal layer may comprise fibrous material. If fibrous material is present, the main purpose of the fibrous material is typically to act as a carrier of the independent third resin volumes prior to the consolidation and/or curing of the third resin. The fibre content is hence low compared to situations where the main purpose of the fibrous material is to act as reinforcement or as means for gas transportation. Typically, the fibre content should be below about 25 weight-% and preferably below about 10 weight-%.

In a preferred embodiment, however, fibrous material is included in the gas-removal layer to provide potential equalising between the members to be connected. This is particularly relevant when the members are conductive or comprise conductive fibres. The main purpose for including fibrous material may in such cases be the potential equalising or a combination of potential equalising and support of the independent third resin volumes.

The removal of gas from the interface between the members may for example be realised via a vacuum applied on the interface, by mechanically forcing the gas out of the interface, by chemically reacting at least part of the gas or by a combination of at least two of these methods. If a vacuum method is applied, it is preferred to include the step of providing a vacuum enclosure encompassing said interface and optionally said first member and/or said second member. In a preferred embodiment, the vacuum enclosure is flexible such that the consolidation may be enhanced by pressing on the interface and optionally said first member and/or said second member for example via a vacuum inside the vacuum enclosure or by an external press. Mechanical forcing out the gas may for example be realised by an external press, for example by substantially the same pressure on the entire surface or by a sweeping and/or increasing pressure on the interface, which method may force the gas to one end of the interface.

The deformation of the gas-removal layer is intended to remove or diminish the open volume of the gas-removal layer. This may for example be realised by temporarily overcoming the viscosity of the third resin for example by mechanical pressure or—preferably—decreasing the viscosity of the third resin by heating. The lowering of the viscosity allows for the gas-removal layer to flow or melt together, thereby reducing the open volume of the gas-removal layer. In a preferred embodiment, the decreasing of the viscosity is controlled to ensure that the decreasing of the viscosity takes place in a zone moving through the interface. This may ensure that the gas transport may proceed from the zone to an outer surface during the moving of the zone.

The deformation may also be realised at least partially by plastically deforming the gas-removal layer by an external force such as via a vacuum in a vacuum enclosure or by a press. The deformation rate of the gas-removal layer is particularly high when a decrease of the viscosity of the third resin is combined with an external force.

In a preferred embodiment, the deforming of the gas-removal layer takes place gradually starting away from a gas exit and ending near or at a gas exit. This procedure is advantageous as it reduces the risk that gas may become entrapped inside the gas-removal layer as the layer is deformed and the open volume is removed. This may for example be realised by heating the interface inhomogeneously thereby providing a heated zone moving through the interface. In the heated zone, and optionally behind it, the viscosity and/or the mechanical pressure is sufficient to deform the gas-removal layer, whereas the part of the interface in front of the heated zone is only affected to a limited extent. The gas transportation network is hence open in front of the heated zone and the gas may be very efficiently removed from the interface.

The thickness of the deformed gas-removal layer after complete consolidation and/or curing is typically in the order of 100 µm to 500 µm and preferably in the order of 200 µm to 300 µm, however, layers having much greater thickness such as 1 to 2 mm may also be feasible. The thick layers may for example be useful when relatively rigid members are connected, particularly if the members do not fit very well together. The thin layers are particularly feasible when at least one of the members to be connected is relatively soft and hence may comply closely with the other member.

The viscosity of the third resin is important to the inventive concept. The viscosity at room temperature should be sufficiently high to ensure, that the individual third resin volumes possess sufficient mechanical strength to sustain gas permeability (i.e. keeping the gas transportation network open) under vacuum, preferably at least for a period of time in the order of minutes. This will typically correspond to the third resin being solid or semi-solid at room temperature. During consolidation, the viscosity will usually be lowered. This may for example be realised by heating. It is important, that the connection is consolidated, i.e. the gas is removed, before the curing has finished. Preferably, the consolidation is substantially finished before the main curing takes place. In a preferred embodiment, the gas-removal layer is heated gradually in the interface between the first and the second member to realise the desired deformation and consolidation in the gas-removal layer by gradually heating the interface. As the temperature is raised, the viscosity of the third resin will usually decrease until the curing reaction dominates and the viscosity increases again. In a preferred embodiment using an epoxy-based third resin, the lowest viscosity is realised at about 80 to 90° C. and the minimum viscosity is in the order of 10,000 to 1,000,000 cP such as about 100,000 cP. However, both higher and lower viscosity values may be desirable in some cases.

In a preferred embodiment, the third resin wets at least some of the surrounding material such as the first and the second member and the elements of these during the deformation of said gas-removal layer. This is preferable since if the third resin wets surrounding material, a stronger binding to this material is obtained.

In a preferred embodiment, extra resin is provided to the interface between the first member and the second member. The extra resin may in a preferred embodiment be provided with the gas-removal layer, i.e. on the same time as the gas-removal layer is provided. In a particularly preferred embodiment, the extra resin may be an integrated part of the gas-removal layer such as a part of the structure making up a gas transportation network. It is particularly important to provide extra resin, if the members are not completely wet by their respective resins, as wetting of the fibres are needed to realise the maximum mechanical strength of the final composite structure.

In another preferred embodiment, excess resin is removed from the interface and/or nearby parts of the members during the deformation of the gas-removal layer. Generally speaking, the resin is not as strong as the fibre-reinforced members and if too much resin is present near the interface, removal of excess resin may increase the mechanical performance of the interface and hence of the final connection. The excess resin may for example be removed through the gas-removal layer if the resin melted as a part of the consolidation process.

In a preferred embodiment, the gas transportation network is mainly formed by the space between independent three-dimensional volumes of the third resin. Hence, a transportation network having a very high number of transportation channels are provided. Due to the network it is much less likely that gas will be trapped within the interface without a route to escape. In a more preferred embodiment, the network is formed substantially by the space between independent three-dimensional volumes of said third resin, and in another preferred embodiment, the network is formed solely by the space between independent three-dimensional volumes of said third resin.

The volumes of third resin may take a vast number of shapes such as cylinders, cones, spheres, cubes, cylinders and cones having a polygonal cross section, irregular lumps, etc. A person skilled in the art will be able to derive a number of relevant shapes on the basis of the present invention. Lines of third resin—particularly if a network of lines is distributed—may provide for a gas transport in a number of overall directions. However, a gas-removal layer comprising only parallel lines of third resin is disadvantageous as it is likely that one or more of the channels are closed off before all gas has been removed, hence leading to entrapment of gas as no alternative gas-removal route is present. This type of gas-entrapment is much less likely when independent volumes of third resin are used, as a number of alternative gas-removal routes will be present until a late stage of the consolidation and/or curing process.

The individual volumes of third resin may be distributed randomly or in a systematic method. Examples of systematic methods are trigonal, hexagonal and tetragonal geometries, straight, curved, open or closed lines and any combination of these. The size, height and distribution including distance between the individual volumes of third resin may vary in broad ranges mainly depending on conditions like for example the rigidity of the members to be connected (e.g. the less rigid the members, the taller the volumes of third resin and/or the shorter the distance between the individual volumes of third resin) and the viscosity of the third resin (e.g. the lower the viscosity of third resin, the taller the volumes of third resin and/or the shorter the distance between the individual volumes of third resin). If vacuum is applied then the volumes should have sufficiently structural strength to be able to keep the transportation network open at least at room temperature. The height of the volumes and the distance between the individual volumes should ensure that the transportation network is open at the initiation of the consolidation and/or curing reaction to ensure removal of gas. It may be possible to derive empirical formulas for establishing the optimum conditions in a given situation, however, such conditions may also be derived by systematic and/or trial-and-error experimental work, which may be performed by a person skilled in the art.

The gas-removal layer may be provided in a number of ways dependent on for example the degree of automation and the size of the members. In a first embodiment, the gas-removal layer is provided by a method comprising the following steps:

providing an at least semi-solid third resin, optionally by cooling;

dividing said third resin to obtain an at least semi-solid third resin granulate;

distributing said at least semi-solid third resin granulate to form a gas-removal layer having a gas transportation network, which provides for gas transportation in a number of overall direction in a plane of said gas-removal layer.

By at least semi-solid is meant semi-solid or solid. By semi-solid is meant a highly viscous fluid or a soft solid.

By granulate is meant discrete particles of third resin of any regular or irregular shape and size. Granulate shapes may for example be spherical, polygonal, cylindrical, plate-like, cigar-like, chip-like, semi-spherical or a combination of any of these. However, the shapes are not limited to these examples and a person skilled in the art will be able to give more examples of possible shapes. The individual granulate particles may have similar shape and size, however, this is not a requirement. In a preferred embodiment, a range of shapes and/or sizes of granulate particles are utilised in the preparation of one connection.

By this embodiment, a very simple method of obtaining a gas-removal layer having a gas transportation network is provided. The dividing of the third resin may involve any known technique for dividing a solid or semi-solid third resin, such as for example cutting, grinding, grating or rubbing. Alternatively, the granulate may be formed as an integrated part of the formulation of the third resin such as e.g. forming of granulate particles from a liquid prior to solidification.

If the third resin is sticky at room temperature it may advantageously be stored at reduced temperature. When the third resin heats to room temperature, the sticky nature of such a third resin may then help to fix the connection in position until the curing of the interface.

The dividing and the distributing of the third resin may easily be automated for example by robotics and this embodiment may hence be easy and fast to manufacture.

In a second embodiment, the gas-removal layer is provided by a method comprising the following steps:

providing a liquid third resin, optionally by heating;

distributing said liquid third resin to form a gas-removal layer having a gas transportation network, which provides for gas transportation in a number of overall directions in a plane of said gas-removal layer;

optionally cooling and/or reacting said third resin to an at least semi-solid state.

By applying the third resin in a liquid state, it is easier to control the size and/or the distribution of the third resin to realise the desired gas-removal layer. The third resin may for example be applied as dots, areas, lines, etc. The distribution may be random or organised.

If the third resin is liquid at room temperature and the chosen method involves providing a vacuum on the interface, it is preferred to apply the vacuum on the interface while the third resin is in an at least semi-solid state to prevent premature deformation of the gas transportation network.

In a preferred embodiment of the above methods for providing a gas-removal layer, the third resin is distributed directly in the interface between said first member and said second member. In a more preferred embodiment, the third resin is distributed directly on at least one of said first and second members before connecting said first and second member. This method is particularly suited for a fully automated process, for example by robotics.

In another preferred embodiment of the above methods for providing a gas-removal layer, the third resin is provided on a support, which is later introduced into the interface. This may be advantageous, if the gas-removal layer is prepared in advance to or at another location than the connection of the members. The parts for the connection may then be prepared at a central facility, whereas the actual formation of the connection may take place at the site of the final application of the composite structure.

This may for example be realised by the following steps:

providing a support in connection with said third resin to enhance handling of said gas-removal layer optionally heat said gas-removal layer to provide for a stronger binding between said support and said third resin;

said support is a sheet-like member mainly comprising a resin and/or a fibrous material, like for example a woven or non-woven fabric, a prepreg, a semi-preg, a web or sheet of resin and/or fibres, a veil, a release paper, etc.

The optional heating to provide a stronger binding is particularly relevant if the third resin is unsticky at room temperature. In many cases, the sticky nature of the third resin will be sufficient to hold the cover sheet connected to the gas-removal layer. It is preferred but not required that the support is flexible as this may facilitate the adjustment of the shape of the gas-removal layer to the shape of the interface.

In a preferred embodiment, the support consists of a resin, which may or may not have the same composition as the third or any other of the resins. This embodiment is advantageous in that it does not introduce fibrous material into the interface during establishing of the connection. The support resin is preferably shaped as a sheet or as a web. By web is meant lines of resin forming an at least two-dimensional network.

By veil is for example meant a non-woven, open, gas permeable web of randomly distributed carbon fibres held together by an organic binder. An example of a relevant veil is a carbon veil.

The support material may or may not be separated from the gas-removal layer when the gas-removal layer is applied.

In a third embodiment for providing a gas-removal layer, the gas-removal layer is provided by a casting technique preferably comprising the following steps:

providing a mould, said mould does not stick significantly to the third resin;

casting a gas-removal layer having a gas transportation network, which provides for gas transportation in a number of overall directions in a plane of said gas-removal layer, and optionally providing a support to enhance handling of said gas-removal layer, said support is a sheet-like member mainly comprising a resin and/or a fibrous material, like for example a woven or non-woven fabric, a prepreg, a semi-preg, a web or sheet of resin and/or fibres, a veil, a release paper, etc.

Examples of relevant moulds are silicone or coated metal moulds. An easy way to prepare a mould is to prepare a positive image of the desired gas-removal layer and subsequent make a cast using a silicone material. When the silicone is cured, the silicone may be used as a mould. Other ways to prepare moulds and other types of moulds are known in the art and gas-removal layers prepared by such moulds are hence within the scope of the invention.

The production of cast gas-removal layers may advantageously be automated as well as preparing of a connection using a cast gas-removal layer for connecting two members.

In a preferred embodiment, the mould provides for formation of a network between the parts making up the gas transportation network. This may for example be formed as a web or as a continuous or non-continuous sheet, however, the web or the non-continuous sheet is preferred.

Alternatively, a support equivalent to that described above may be applied prior to or after the casting. In a preferred embodiment, an open web of fibres is applied to the mould prior to the casting and hence a very strong connection between the fibres and the cast third resin may be realised. The open web may for example be a veil, a woven or non-woven fabric, a prepreg, a semi-preg, fibre tows or tow-pregs.

Any of the above embodiments for providing a gas-removal layer may further comprise the step of providing a cover sheet on the gas-removal layer to form a sandwich gas-removal layer for enhanced handling. The cover sheet may for example by a sheet-like member mainly comprising a resin and/or a fibrous material, like for example a woven or non-woven fabric, a prepreg, a semi-preg, a web or sheet of resin and/or fibres, a veil or a release paper.

The cover sheet may or may not be of the same type as the optional support. Such a sandwich gas-removal layer is well suited for shipping and/or storing, as the risk of stacked sandwich gas-removal layers sticking together is reduced compared to the gas-removal layers without the cover sheet. Furthermore, some of the chemical substances in resins are hazardous and a cover sheet may reduce the amount of direct contact.

In a preferred embodiment of the invention, the gas-removal layer is provided as an integrated part of at least one of said first and second members. The gas-removal layer may for example advantageously be provided on the member as a part of the preparation of the member. This may save time and equipment for the connection procedure.

In another aspect, the invention provides a gas-removal layer, which comprises a support supporting a third resin, the third resin has a gas transportation network and said gas transportation network provides for gas transportation in a number of overall directions in a plane of said gas-removal layer. Such a gas-removal layer is particularly suited for removal of gas from the interface between two members to be connected as discussed hereinbefore. In a preferred embodiment, the gas-removal layer is flexible to ensure that it may conform to the members to be connected.

In a preferred embodiment, the gas transportation network is mainly formed by the space between independent three-dimensional volumes of the third resin as this is a very simple and yet highly functional design as discussed hereinbefore.

The support member is preferably a sheet-like member mainly comprising a resin and/or a fibrous material, like for example a woven or non-woven fabric, a prepreg, a semi-preg, a web or sheet of resin and/or fibres, a veil or a release paper. In a preferred embodiment, the support member consists of resin and the support member may hence be applied to a connection without introducing fibrous material.

In a preferred embodiment of the gas-removal layer, the gas-removal layer further comprises a cover sheet. The cover sheet may or may not be of the same type as the support member. A cover sheet enhances the handleability of the gas-removal layer and particularly the storage and shipping properties are enhanced, as the layers with cover sheets are less prone to stick together even if they have been placed directly on top of each other.

In another aspect of the present invention, a small amount of dry or partially impregnated fibres or fibre-tows are integrated into a gas-removal layer as described hereinbefore to form a combined gas-removal layer. The fibres may hence provide for a limited gas transportation, however, the gas transportation via the gas transportation network formed by independent third resin volumes should be dominant and the fibre content should be below about 25 weight-% and preferably below about 10 weight-%. In a preferred embodiment, the fibres are mainly oriented in the preferred gas-removal direction or directions. Examples of relevant fibres are the fibres mentioned hereinbefore in relation to first type fibres and second type fibres, however, it is preferred to use glass fibre and/or carbon fibres.

If one or both of the members to be connected comprises conductive material such as carbon fibres, there is a risk that flashover between the members may take place, unless the potential on the two sides of the interface is equalised. It is therefore highly desirable to provide an electrical conductive connection, which will ensure potential equalising across the interface. In a preferred embodiment, a potential equaliser is integrated with the gas-removal layer. The electrical connection may for example be realised via electrically conductive fibres, such as carbon fibres, or a metal, however, it is preferred that the potential equaliser comprises carbon fibres.

The electrical connection between the members will typically go around the gas-removal layer or through the gas-removal layer. An example of an electrical connection going around the gas-removal layer is a tow or tow-preg comprising carbon fibres wound around the gas-removal layer, e.g. in a helix pattern or equivalent, prior to providing the gas-removal layer in the interface. An electrical connection going through the gas-removal layer may for example comprise carbon fibres and/or metal pieces stitched or in another way applied through the gas-removal layer. Experimental results have shown that an electrical connection through the gas-removal layer may also be realised by using a carbon veil as support and/or cover sheet. An electrical connection is easiest provided in relation to the gas-removal layer when the gas-removal layer comprises a support and/or a cover sheet. It should be observed that the electrical connection does not need to be established until during the curing of the structure. In case of the gas-removal layer, it should hence be considered that the gas-removal layer is highly deformed during the consolidation and/or curing of the interface, where the distance between the members is reduced and the connection may often relatively easy be established during this.

The gas-removal layers according to the present invention is particularly useful for removal of gas from an interface between a first member and a second member during preparation of a connection between the members, as it has been described previously. Particularly, the gas-removal layer is useful when at least one of the members is non-rigid.

The gas-removal layer and the method according to the present invention are particularly useful for preparing of a wind turbine blade and particularly a spar for a wind turbine blade and a shell for a wind turbine blade as these composite structures are very long parts, which may advantageously be prepared in smaller sections that are later combined. Furthermore, these composite structures are load-bearing, and good mechanical quality and reproducibility, which are some of the advantages of the present invention, are detrimental to the performance of the final structures.

BRIEF DESCRIPTION OF THE DRAWINGS

The invention will be explained in more detail below with reference to particularly preferred embodiments as well as the drawings, in which.

All the figures are highly schematic and not necessarily to scale, and they show only parts which are necessary in order to elucidate the invention, other parts being omitted or merely suggested.

DESCRIPTION OF THE DRAWINGS

Figure 1:
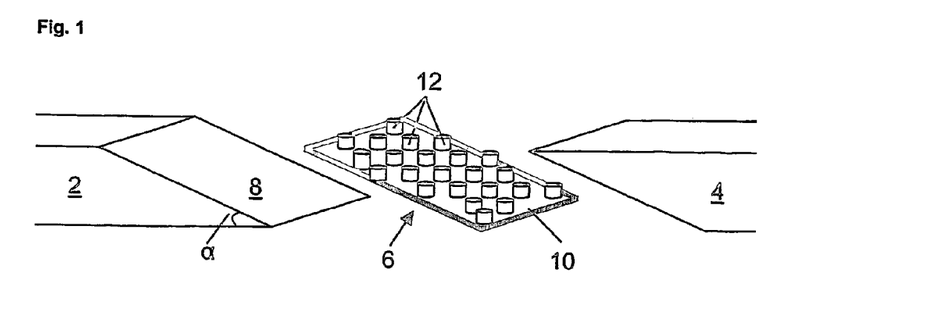
FIG. 1 shows two members and a gas-removal layer.

In FIG. 1, the first member 2 and the second member 4 to be connected are shown. The interface angle $\alpha$ is the angle between the face, which will be the interface 8 between the first and the second member when connected, and a side of the first member 2. In FIG. 1, $\alpha$ is drawn with an angle considerably smaller than 90°. If $\alpha$ is decreased, the area of the interface 8 is increased, which will usually lead to a stronger connection if the interface is free from gas voids. In a preferred embodiment, $\alpha$ is less than about 10° but an even better connection may by obtained when the angle is less than about 2°. If the members comprise fibres, which are very stiff such as carbon fibres, $\alpha$ may in some cases advantageously be as low as 0.5° to 1° or even lower. This is particularly advantageous when the members are reinforced by unidirectional fibres via the connection. The low $\alpha$ angles may then allow for side-by-side connection between the fibres of the first and the second members, which are preferable compared to end-to-end connection realised with larger $\alpha$ angles.

A gas-removal layer 6 is shown between the members 2, 4. The gas-removal layer has a number of independent third resin volumes 12 forming a gas transportation network and a support 10. The main task of the support 10 is to fix the relative positioning of the independent third resin volumes. The number of third resin volumes 12 has been reduced for reasons of clarity. Typical values with regard to size of the independent third resin volumes are height of about 1 to 3 mm with a diameter of about 4 to 6 mm and separated by about 10 mm between the centres. However, the size and separation may vary considerably dependent on viscosity of the third resin and the properties of the members (e.g. rigidity). The height may for example vary between about 0.1 mm to 5 cm or even more, the separation may for example vary between about 1 mm to 20 cm or even more and the diameter may for example vary between about 1 mm to 5 cm or even more. The geometrical shape of the independent third resin volumes may in principle be any shape as long as it allows for formation of a gas transportation network, however, simple geometrical shapes such as spheres, semi-spheres, cylinders, cones, cubes or truncated geometrical shapes are preferred.

The size and separation of the individual independent third resin volumes may be the same for all the third resin volumes or it may vary. For example the height of the third resin volumes are larger near the gas exit in a preferred embodiment.

In FIG. 1, it is indicated that the connection will lead to a linear extension of the first member. Other types of feasible connections are for example T-connections (i.e. where a member is connected substantially orthogonally to another member), L-connections (i.e. where a member is connected substantially orthogonally to another member near or at the end), Y-connections (i.e. where two or more members are connected at an angle different from 90°), face-to-face (i.e. where two main surfaces of the members are connected). A person skilled in the art will based on these examples be able to derive other feasible applications of the method according to the invention.

Figure 2:
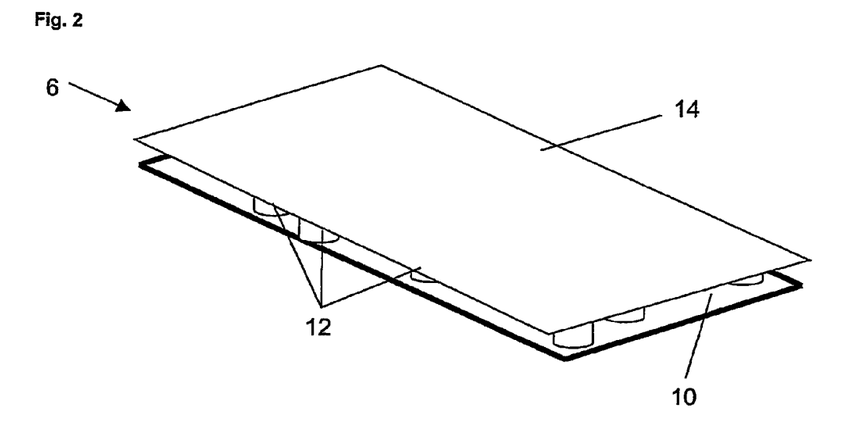
FIG. 2 shows a gas-removal layer.

In FIG. 2, a gas-removal layer 6 with a cover sheet 14 is shown. The cover sheet may for example be a release paper or comprise a fibrous and/or a resinous material. Typically, the main task of the cover sheet is to enhance handling of the gas-removal layer. However, the cover sheet may serve other purposes such as for example allow for stacking of gas-removal layers during transportation and/or storage or protecting the independent third resin volumes from damage (e.g. mechanical, chemical, thermal, etc.). The cover sheet may or may not be removed prior to the formation of the connection.

In a preferred embodiment particularly suitable for connecting electrically conductive members or members comprising electrically conductive fibres, the support 10 and the cover sheet 14 comprise an open web of conductive fibrous material. The web may for example be a carbon veil or another material possessing equivalent relevant properties.

Figure 3:
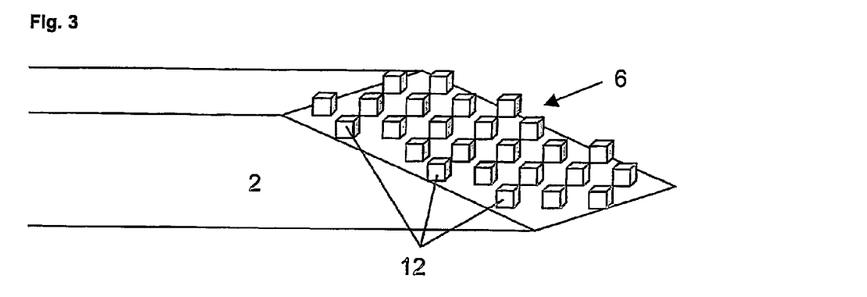
FIG. 3 shows a member with an integrated gas-removal layer.

In FIG. 3, a first member 2 with an integrated gas-removal layer 6 is shown. In a preferred embodiment, the independent third resin volumes 12 of the gas-removal layer 6 are distributed on an interfacing part of the member as one of the final steps of the member preparation. This may save considerable amounts of time and equipment in preparing the connection as equipment being able to distribute the independent third resin volumes 12 is often used during the manufacturing of the members. The member 2 with integrated gas-removal layer 6 as shown in FIG. 3 may be connected to a member with or without an integrated gas-removal layer. In a preferred embodiment, the a cover sheet and/or a support is further provided with the integrated gas-removal layer for example to enhance handling and/or potential equalising between the members to be connected.

Figure 4:
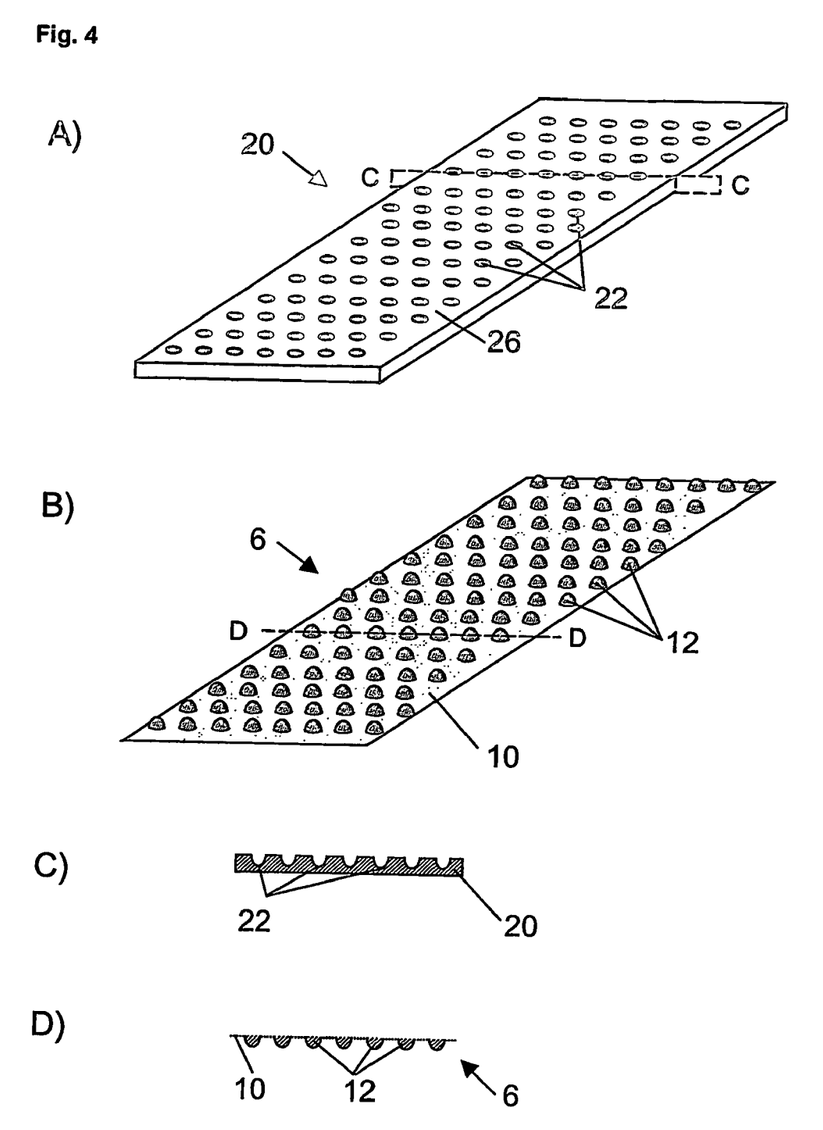
FIG. 4 shows a mould and a cast gas-removal layer.

In FIG. 4, an example of a mould 20 for casting of gas-removal layers are shown. In FIG. 4A, the mould 20 is observed from a topside perspective. A number of depressions 22 are visible in the inner mould surface 26. The mould may be rigid or flexible and preferably the inner mould surface 26 should not stick to the third resin of the gas-removal layer. In FIG. 4B, the cast gas-removal layer 6 is observed. The gas-removal layer may for example be prepared by distributing a third resin such as an epoxy resin into the depressions 22 in the mould 20 shown in FIG. 4A by gravity or with the use of a suitable tool such as a spatula or a filling knife. In a preferred embodiment, the third resin will substantially only be present in the depressions. Then the support is placed on the mould in contact to the third resin and after solidification of the third resin (e.g. by cooling) the gas-removal layer may be removed. If a flexible mould is used, the mould may be bent to enhance release of the gas-removal layer. The depressions 22 in FIG. 4A are hence forming the independent third resin volumes 12. The independent third resin volumes 12 are held together by a support layer 10, which for instance may be a carbon veil or another suitable material as discussed elsewhere. In FIG. 4C, a cross section through some depressions 22 of the mould 20 is shown. The depressions 22 of the mould 20 shown in FIG. 4A are distributed in rows, however, most other types of distributions are feasible including regular patterns like hexagonal, trigonal, tetragonal and irregular patterns. It is, however, required that the relationship between the shape, size and distribution of the independent third resin volumes provides for the formation of a gas transportation network that is open at least on the initiation of the gas-removal process. In FIG. 4D, a cross section of the gas-removal layer 6 is shown. It is observed that the independent third resin volumes 12 are held together by the support 10.

Figure 5:
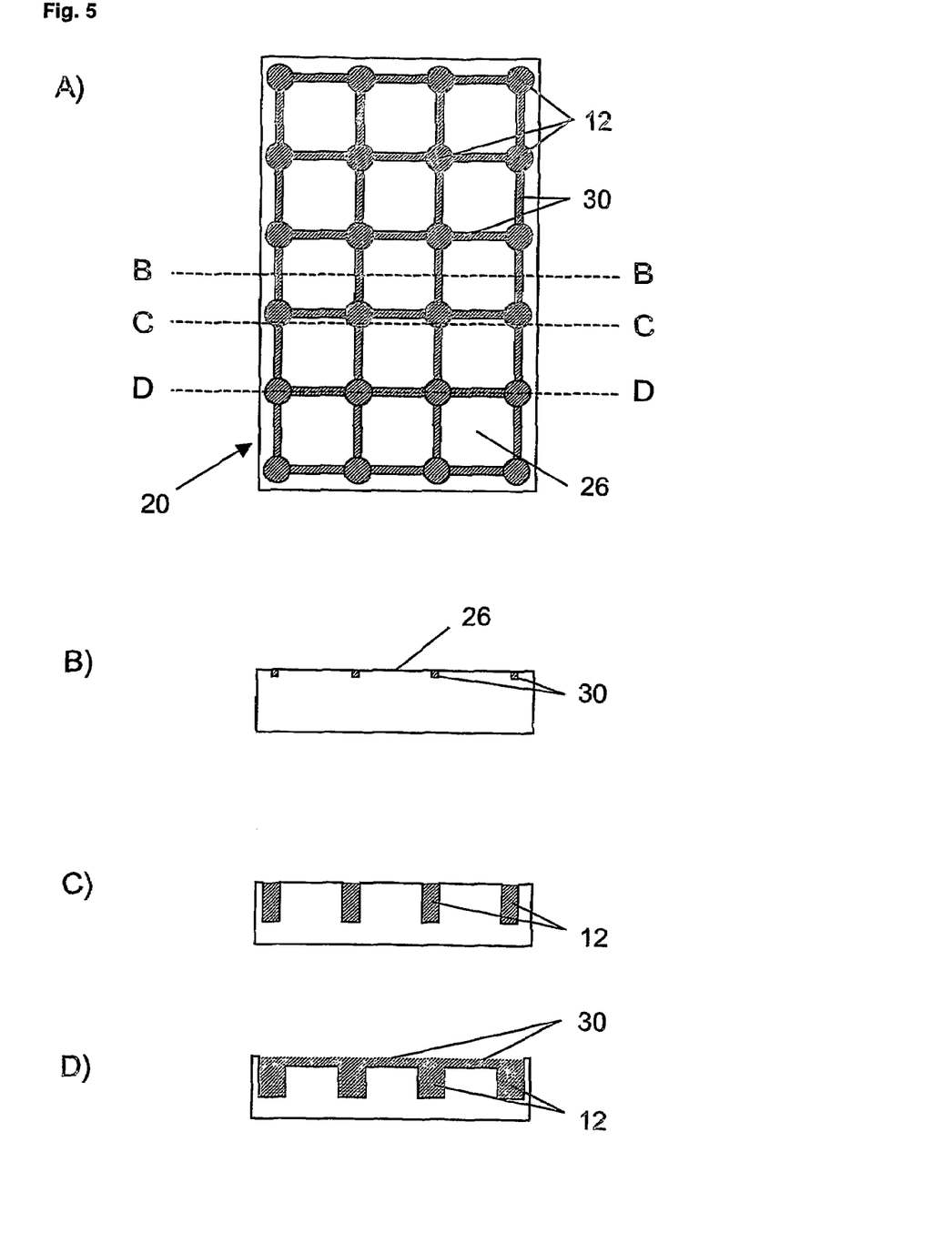
FIG. 5 shows a mould for casting of a gas-removal layer with a support web.

In FIG. 5, a mould 20 with a third resin indicated by hatched areas is shown. The mould is suitable for preparing a gas-removal layer having a support web 30 for connecting the independent third resin volumes 12. In FIG. 5A, a top view of the mould 20 is shown. The independent third resin volumes 12 are cylindrical depressions 22 (but any other castable geometry or combination of geometries is feasible such as e.g. inverted cones, semi-spheres, cubes, etc.) into the inner mould surface 26. The support web 30 for holding the independent third resin volumes 12 together is prepared in channels between the third resin volumes 12 but other castable geometries are feasible. It should be noted that the support web 30 is within the scope of the support element mentioned hereinbefore. In FIG. 5B, a cross section along the line B-B in FIG. 5A is shown. The support web 30 for connecting the independent third resin volumes is observed as relatively narrow depressions into the inner mould surface 26. In FIG. 5C, a cross section along the line C-C in FIG. 5A is shown. The independent third resin volumes 12 are observed without any connection between them in this cross section. In FIG. 5D, a cross section along the line D-D in FIG. 5A is shown. Here, both the independent third resin volumes 12 and the web 30 for connecting the independent third resin volumes are observed.

In a preferred embodiment, a mould for casting of a gas-removal layer, such moulds as those shown in FIG. 4 and FIG. 5, comprises:

an inner mould surface, and
a number of depressions in the mould surface resembling the desired independent third resin volumes to be cast.

The mould may be rigid with an easy release surface and/or coating or flexible with non-sticking surface, however, it is preferred that the mould is flexible and more preferably the mould is made from a silicone-based material or a material having similar properties.

The mould may further comprise a number of channels connecting at least two of the depressions.

Such a flexible mould for casting of a gas-removal layer may for example be prepared by a method comprising the steps of:
preparing a positive, three-dimensional surface of the desired structure;
providing a silicone-based resin or a material having similar properties on the three-dimensional surface,
curing the silicone-based resin, and
removing the silicone-based resin after curing of the silicone-based resin, whereby the flexible mould is provided.

This method and the mould are easy to use and provide moulds of suitable design flexibility and strength for the production of gas-removal layers by casting.

TABLE FOR IDENTIFICATION

2 First member
4 Second member
6 Gas-removal layer
8 Interface between first member and second member
10 Support
α Interface angle
12 Independent third resin volume
14 Cover sheet
20 Mould
22 Depression
26 Inner mould surface
30 Support web

The invention claimed is:

1. A method for functionally connecting a first member, comprising first fibres and a first resin, and a second member, comprising second fibres and a second resin, said method comprising the steps of:
providing said first member;
providing said second member adjacent to aid first member;
providing a gas-removal layer in at least a part of an interface between said first member and said second member, said gas-removal layer allowing for gas transport in all overall directions in a plane of said gas-removal layer, said gas-removal layer comprising a third resin, and a gas transportation network is mainly formed by the space between independent three-dimensional volumes of said third resin, wherein the gas-removal layer comprises discrete volumes of the third resin, the volumes of the third resin having dimensions smaller than distances between respective volumes of resin;
removing gas from said interface between said first member and said second member via said gas-removal layer;
deforming said gas-removal layer;
consolidating and/or curing said interface; and
optionally co-consolidating and/or co-curing said first member and/or said second member.

2. A method according to claim 1, further comprising the step of providing a vacuum enclosure encompassing said interface and optionally said first member and/or said second member.

3. A method according to claim 1, wherein the deforming of said gas-removal layer involves temporarily decreasing the viscosity of said third resin.

4. A method according to claim 1, wherein during the deforming of the gas-removal layer, said third resin wets at least some of the surrounding material.

5. A method according to claim 1, wherein the deforming of said gas-removal layer involves an external force.

6. A method according to claim 1, wherein the deforming of said gas-removal layer takes place gradually starting away from a gas exit and ending near or at the gas exit to reduce the risk of gas entrapment by heating the interface inhomogeneously, thereby providing a heated zone moving through the interface.

7. A method according to claim 1, wherein the height and spacing of said independent three-dimensional volumes are adjusted to ensure that said gas transportation network is open until a suitable amount of gas has been removed.

8. A method according to claim 1, further comprising the following steps for providing said gas-removal layer:
providing an at least semi-solid third resin, optionally by cooling;
dividing said third resin to obtain an at least semi-solid third resin granulate; and
distributing said at least semi-solid third resin granulate to form a gas-removal layer having a gas transportation network, which provides for gas transportation in a number of overall directions in a plane of said gas-removal layer.

9. A method according to claim 1, further comprising the following steps for providing said gas-removal layer:
providing a liquid third resin, optionally by heating;
distributing said liquid third resin to form a gas-removal layer having a gas transportation network, which provides for gas transportation in a number of overall directions in a plane of said gas-removal layer; and
optionally cooling and/or reacting said third resin to an at least semi-solid state.

10. A method according to claim 8, wherein the third resin is distributed directly in said interface between said first member and said second member.

11. A method according to claim 8, further comprising the step of:
providing a support in connection with said third resin to enhance handling of said gas-removal layer, and
optionally heat said gas-removal layer to provide for a stronger binding between said support and said third resin,
such that said support is a sheet-like member mainly comprising a resin and/or a fibrous material.

12. A method according to claim 1, wherein the gas-removal layer is provided by the following steps:
providing a mould;
casting a gas-removal layer having a gas transportation network, which provides for gas transportation in a number of overall directions in a plane of said gas-removal layer; and
optionally providing a support to enhance handling of said gas-removal layer, said support is a sheet-like member mainly comprising a resin and/or a fibrous material.

13. A method according to claim 8, further comprising the step of providing a cover sheet on the gas-removal layer to form a sandwich gas-removal layer for enhanced handling, said cover sheet is a sheet-like member mainly comprising a resin and/or a fibrous material.

14. A method according to claim 1 further comprising the step of providing extra resin to said interface between said first member and said second member.

15. A method according to claim 1, wherein the gas-removal layer is provided as an integrated part of at least one of said first and second members.

16. A method according to claim 1, further comprising the step of providing a potential equalizer between said first member and said second member.

17. A method according to claim 16, wherein an electrical conductive connection is established during the curing.

18. The method of claim 1, wherein said third resin has a gas transportation network mainly being formed by the space between independent three-dimensional volumes of said third resin, said gas transportation network provides for gas transportation in all overall directions in a plane of said gas-removal layer, and wherein said gas-removal layer further comprises a support upon which the third resin is disposed, said support being a sheet-like member mainly comprising a fibrous material.

19. The method of claim 1, wherein the gas-removal layer further comprises a cover sheet to enhance handling.

20. The method of claim 1, wherein the first member, second member and interface form part of a wind turbine blade.

21. The method according to claim 1 further comprising using the method to prepare a wind turbine blade.

22. The method of claim 20, wherein the gas-removal layer is used in a spar for a wind turbine blade.

23. The method of claim 21, wherein the gas-removal layer is used in a spar or blade of a wind turbine blade.

24. The method of claim 11, wherein the fibrous material is selected from the group consisting of a woven or non-woven fabric, a prepeg, a semi-preg, a web or sheet of resin and/or fibres, a veil and a release paper.

25. The method of claim 12, wherein the fibrous material is selected from the group consisting of a woven or non-woven fabric, a prepeg, a semi-preg, a web or sheet of resin and/or fibres, a veil and a release paper.

26. The method of claim 13, wherein the fibrous material is selected from the group consisting of a woven or non-woven fabric, a prepeg, a semi-preg, a web or sheet of resin and/or fibres, a veil and a release paper.

27. The method of claim 14, wherein at least some of said extra resin is provided with said gas-removal layer.

28. The method of claim 14, wherein at least some of said extra resin is provided as an integrated part of said gas-removal layer.

29. The method of claim 16, wherein the potential equalizer is integrated with the gas-removal layer.

30. The method of claim 1 wherein the volumes of resin having dimensions of height, width and length less than the distances between the volumes of the third resin.

* * * * *